US007953525B2

(12) United States Patent
Oyobe et al.

(10) Patent No.: US 7,953,525 B2
(45) Date of Patent: May 31, 2011

(54) ELECTRICAL POWERED VEHICLE INCORPORATING MOTOR AND INVERTER, AND CONTROL METHOD THEREFOR

(75) Inventors: Hichirosai Oyobe, Toyota (JP); Makoto Nakamura, Okazaki (JP); Masaya Yamamoto, Kasugai (JP); Hideaki Saida, Toyota (JP); Satoru Katoh, Nisshin (JP); Hiroaki Kato, Toyota (JP); Yoshinori Tomita, Okazaki (JP); Haruki Sato, Toyota (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 4 days.

(21) Appl. No.: 12/573,204

(22) Filed: Oct. 5, 2009

(65) Prior Publication Data
US 2010/0094497 A1    Apr. 15, 2010

(30) Foreign Application Priority Data
Oct. 15, 2008    (JP) .................................. 2008-266565

(51) Int. Cl.
  *B60L 11/18*    (2006.01)
  *B60L 9/18*    (2006.01)
  *B60L 3/00*    (2006.01)
(52) U.S. Cl. ........................................ 701/22; 180/65.1
(58) Field of Classification Search .................... 701/22; 180/65.1
  See application file for complete search history.

(56) References Cited

U.S. PATENT DOCUMENTS

| | | | |
|---|---|---|---|
| 6,608,396 B2 | 8/2003 | Downer et al. | |
| 2009/0008168 A1* | 1/2009 | Yamanaka et al. | ........... 180/65.4 |
| 2010/0096918 A1 | 4/2010 | Sawada et al. | |

FOREIGN PATENT DOCUMENTS

| | | |
|---|---|---|
| JP | 6209532 A | 7/1994 |
| JP | 2003209969 A | 7/2003 |
| JP | 2004147477 A | 5/2004 |
| JP | 2006094691 A | 4/2006 |
| JP | 2008109840 A | 5/2008 |
| JP | 2009183108 A | 8/2009 |
| JP | 2009189152 A | 8/2009 |
| JP | 2009194997 A | 8/2009 |
| WO | WO-2008/041735 A1 | 4/2008 |

OTHER PUBLICATIONS

Decision to Grant Patent in JP 2008/266565.

* cited by examiner

*Primary Examiner* — Mark Hellner
*Assistant Examiner* — Ari M Diacou
(74) *Attorney, Agent, or Firm* — Gifford, Krass, Sprinkle, Anderson & Citkowski, P.C.

(57) ABSTRACT

In an electrical powered vehicle including a control device for generating an input/output power command value for a power storage device and a control device for controlling a power conversion device and a rotating electric machine, provided separately, when there is a sudden change in the rotational speed of a rotating electric machine, the input/output power command value of a power storage device intrinsically set by an HV-ECU is corrected corresponding to the change in the rotational speed of the rotating electric machine by a control device MG-ECU detecting the rotational speed of the rotating electric machine, without having to wait for modification of the input/output power command value from the HV-ECU. Accordingly, there can be prevented excessive charging and excessive discharging of a power storage device induced by delay in modifying the input/output power command value caused by transmission delay between control devices when the rotational speed of the rotating electric machine suddenly changes.

12 Claims, 7 Drawing Sheets

ELECTRICAL POWERED VEHICLE INCORPORATING MOTOR AND INVERTER, AND CONTROL METHOD THEREFOR

This nonprovisional application is based on Japanese Patent Application No. 2008-266565 filed on Oct. 15, 2008, with the Japan Patent Office, the entire contents of which are hereby incorporated by reference.

BACKGROUND OF THE INVENTION

1. Field of the Invention

The present invention relates to an electrical powered vehicle including power storage devices, and a control method therefor, particularly control for preventing excessive charging and discharging of the power storage device.

2. Description of the Background Art

The technique for suppressing, in an electrical powered vehicle incorporating power storage devices, the charging and discharging caused by excessive power of each power storage device is disclosed, for example, in Japanese Patent Laying-Open No. 2006-094691.

According to this publication, a "slow-changing process" is applied to the deviation between the calculated power and actual power that is input/output by a rotating electric machine to smooth the amount of change in the deviation along the time axis, and the limit value of allowable input/output power with respect to the power storage device is calculated based on the smoothed deviation. When the driving state of the vehicle changes greatly such as in a speed-change state or in a slipping state, the "slow-changing process" is carried out using a time constant smaller than that of the general time constant, whereby the limit value of allowable input/output power with respect to the power storage device is modified rapidly. Accordingly, excessive charging/discharging of the power storage device is suppressed.

In view of the control for an electrical powered vehicle, an overall cooperative vehicle control is now being developed based on communication of data and information between electronic control units (ECUs), each ECU provided individually for each control function, from the standpoint of the processing capability of a control device constituted of an ECU. For example, in an electrical powered vehicle, power consumption by the power running operation and power generation by the regenerative operation of the electric motor for driving the vehicle must be carried out within a power range that can be charged/discharged by the power storage device. Under such circumstances, a configuration may be employed in which an ECU for controlling the electric motor and an ECU for setting the charging/discharging command of the power storage device to manage the entire power balance are provided separately.

Consider the case where the driving state such as the rotational speed is abruptly modified at the electric motor. The sudden change in the power consumption or generated power at the electric motor caused by such abrupt modification may not be immediately reflected in the charging/discharging command for the power storage device. There will be time delay including the time required for communication between the ECUs. Particularly in the case where power is charged/discharged taking into account the power distribution among a plurality of power storage devices, there is the possibility of excessive charging or excessive discharging of the power storage device since the charging/discharging command for each power storage device cannot be corrected rapidly in response to the change in the driving state of the electric motor.

SUMMARY OF THE INVENTION

In view of the foregoing, an object of the present invention is to prevent, in an electrical powered vehicle including a control device for generating an input/output power command value for a power storage device and a control device for controlling a power conversion device and a rotating electric machine, provided separately, excessive charging and excessive discharging of a power storage device induced by delay in modifying the input/output power command value caused by delay in transmission between control devices when the rotational speed of the rotating electric machine suddenly changes.

According to an aspect of the present invention, an electrical powered vehicle includes a rotating electric machine, a plurality of power storage devices provided in parallel, a power conversion device, a first control device, and a second control device. The rotating electric machine is configured to allow input and output of motive power with a drive shaft of the vehicle. The power conversion device carries out bidirectional power conversion between the rotating electric machine and the plurality of power storage devices. The first control device generates an operation command value for the rotating electric machine and plurality of power storage devices. The second control device is configured to allow transmission and reception of information mutually with the first control device, and control the power conversion device such that the rotating electric machine and plurality of power storage devices operate according to the operation command value. The second control device includes a speed detection unit, and a speed sudden-change detection unit. The speed detection unit detects the rotational speed of the rotating electric machine based on an output from a sensor provided at the rotating electric machine. The speed sudden-change detection unit detects a sudden change in the rotational speed based on the detected result by the speed detection unit. The first control device includes a power command generation unit generating a plurality of input/output power command values for each of the plurality of power storage devices according to input/output power of the rotating electric machine based on the rotational speed detected by the speed detection unit and a state of charge of each of the plurality of power storage devices. The second control device includes a charge/discharge power control unit controlling charging and discharging of the plurality of power storage devices through the power conversion device according to a plurality of input/output power command values set by the power command generation unit of the first control device when the speed sudden-change detection unit does not detect a sudden change, and controlling charging and discharging of the plurality of power storage devices through the power conversion device by correcting at least a portion of the plurality of input/output power command values from the first control device to reflect change in the rotational speed when the speed sudden-change detection unit detects a sudden change.

By the control device (second control device) detecting the rotational speed of the rotating electric machine in the electrical powered vehicle, the input/output power command value of a power storage device can be modified without waiting for the intrinsic modification of the input/output power command value for a power storage device that is transmitted from the first control device through communication. When the rotational speed of the rotating electric machine suddenly changes, an input/output power command value reflecting the sudden change in the rotational speed can be set without data communication between the control devices. As a result, excessive charging and discharging of the power storage device induced by delay in modifying the command value for a power storage device caused by delay in communication between the control devices can be prevented.

Preferably, the power conversion device includes a plurality of converters and an inverter. The plurality of converters are connected between a power line and respective plurality of power storage devices. Each of the plurality of converters is configured to carry out bidirectional power conversion between a corresponding power storage device and the power line. The plurality of converters are classified into one voltage control converter, and a balance of at least one current control converter. The inverter is configured to carry out bidirectional power conversion between the power line and the rotating electric machine. The charging/discharging power control unit includes a voltage control unit controlling the voltage control converter such that a voltage of the power line attains a target voltage, and a current control unit controlling a current of each current control converter such that a charging/discharging current of each current control converter attains a target current. The target current of each current control converter is set based on, at a converter whose corresponding input/output power command value is corrected by the charging/discharging power control unit, the target voltage and the corrected corresponding input/output power command value, and at a converter whose corresponding input/output power command value is not corrected by the charging/discharging power control unit, the target voltage and the corresponding input/output power command value by the first control device.

Accordingly, the power control (current control) according to the input/output power command value of each power storage device can be carried out while controlling the charging/discharging voltage of the plurality of power storage devices at a target voltage. Thus, a target power can be input/output with respect to all the power storage devices.

Preferably, the charging/discharging power control unit calculates a total of the input/output power of the rotating electric machine based on the current rotational speed when a sudden change at the rotating electric machine is detected, and corrects at least a portion of the plurality of input/output power command values such that the calculated total power is distributed among the plurality of power storage devices according to a ratio of the plurality of input/output power command values set by the first control device.

By the configuration set forth above, when the rotational speed of the rotating electric machine suddenly changes, the charging/discharging power calculated at the second control device can be distributed according to the distribution ratio of the input/output power command values set by the first control device. Accordingly, concentration of the charging/discharging power at a certain power storage device can be prevented. Excessive charging and discharging of a power storage device can be prevented by an appropriate power distribution.

Preferably, the power command generation unit sets a charging/discharging power upper limit for each of the plurality of power storage devices based on a charging/discharging state. The charging/discharging power control unit corrects the plurality of input/output power command values for any of the plurality of power storage devices such that, when an input/output power command value after correction exceeds the charging/discharging power upper limit, the charging power or discharging power exceeding the charging/discharging power upper limit is distributed to a remaining power storage device not exceeding the charging/discharging power upper limit.

By the configuration set forth above, power can be distributed to a power storage device having room for charging/discharging power, even in the case where the charging/discharging power exceeds the charging/discharging power upper limit at a certain power storage device. Thus, excessive charging/discharging of a power storage device can be prevented.

Preferably, the charging/discharging power control unit corrects a plurality of input/output power command values such that, when a corresponding input/output power command value after correction becomes equal to or greater than the charging/discharging power upper limit, for each of the plurality of power storage devices, the charging power or discharging power exceeding the charging/discharging power upper limit is equally distributed among each power storage device. By the configuration set forth above, concentration of power at a certain power storage device can be prevented even in the case where the total power of a charging power or discharging power exceeds the total of the charging/discharging allowed upper limit of the plurality of power storage devices. Accordingly, excessive damage caused by excessive charging/discharging of a particular power storage device can be prevented.

Preferably, the speed sudden-change detection unit detects a sudden change in the rotational speed when a change in the rotational speed detected by the speed detection unit within a predetermined time exceeds a predetermined threshold value.

By the configuration set forth above, a sudden change in the driving state can be detected at the control device detecting a rotational speed of the rotating electric machine. Accordingly, any effect due to transmission delay between control devices can be eliminated.

According to another aspect of the present invention, a control method for an electrical powered vehicle of the present invention is carried out by a first control device and a second control device configured to allow transmission and reception of information with respect to each other. The electrical powered vehicle includes a rotating electric machine configured to allow input and output of motive energy with a drive shaft, a plurality of power storage devices provided in parallel, and a power conversion device carrying out bidirectional power conversion between the rotating electric machine and the plurality of power storage devices. The control method for an electrical powered vehicle includes the steps of: detecting, by the second control device, a rotational speed of the rotating electric machine based on an output from a sensor provided at the rotating electric machine; and detecting, by the second control device, a sudden change in the rotational speed based on a detected result at the step of detecting a rotational speed. The control method for an electrical powered vehicle further includes the step of generating, by the first control device, a plurality of input/output power command values for each of the plurality of power storage devices, according to an input/output power of the rotating electric machine based on a rotational speed detected by the step of detecting a rotational speed, and each state of charge of the plurality of power storage devices. The control method for an electrical powered vehicle further includes the step of controlling, by the second control device, charging and discharging of the plurality of power storage devices through the power conversion device according to a plurality of input/output power command values from the first control device set by the generating step when a sudden change is not detected at the step of detecting a sudden change, and charging and discharging of the plurality of power storage devices through the power conversion device by correcting at least a portion of the plurality of input/output power command values from the first control device to reflect change in the rotational speed when a sudden change is detected at the step of detecting a sudden change.

Preferably, the power conversion device includes a plurality of converters and an inverter. The plurality of converters are connected between a power line and respective plurality of power storage devices. Each of the plurality of converters is configured to carry out bidirectional power conversion between a corresponding power storage device and the power line. The plurality of converters are classified into one voltage control converter, and a balance of at least one current control converter. The inverter is configured to carry out bidirectional power conversion between the power line and the rotating electric machine. The control method for an electrical powered vehicle further includes the step of controlling the voltage control converter such that a voltage of the power line attains a target voltage, and controlling a current of each current control converter such that a charging/discharging current of each current control converter attains a target current. The target current of each current control converter is set based on, at a converter whose corresponding input/output power command value is corrected by the step of controlling charging/discharging, the target voltage and the corrected corresponding input/output power command value, and at a converter whose corresponding input/output power command value is not corrected by the step of controlling charging/discharging, the target voltage and the corresponding input/output power command value by the first control device.

Preferably, the step of controlling charging/discharging of a plurality of power storage devices includes the step of calculating a total of the input/output power of the rotating electric machine based on the current rotational speed when a sudden change at the rotating electric machine is detected, and correcting at least a portion of the plurality of input/output power command values such that the calculated total power is distributed among the plurality of power storage devices according to a ratio of the plurality of input/output power command values set by the first control device.

Preferably, in the step of generating a plurality input/output power command values, a charging/discharging power upper limit is set for each of the plurality of power storage devices based on a charging/discharging state, by the first control device. The step of controlling charging/discharging of the plurality of power storage devices further includes the step of recorrecting, by the second control device, the plurality of input/output power command values for any of the plurality of power storage devices such that, when an input/output power command value after correction exceeds the charging/discharging power upper limit, the charging power or discharging power exceeding the charging/discharging power upper limit is distributed to a remaining power storage device not exceeding the charging/discharging power upper limit.

Preferably, the step of controlling charging/discharging of the plurality of power storage devices further includes the step of further correcting a plurality of input/output power command values such that, when a corresponding input/output power command value after correction or recorrection becomes equal to or greater than the charging/discharging power upper limit, for each of the plurality of power storage devices, the charging power or discharging power exceeding the charging/discharging power upper limit is equally distributed among each power storage device, by the second control device.

Preferably, in the step of detecting a sudden change, a sudden change in the rotational speed is detected when a change in the rotational speed detected by the step of detecting a rotational speed within a predetermined time exceeds a predetermined threshold value.

By the configuration of the control method set forth above, excessive charging and discharging of a power storage device can be prevented by an appropriate power distribution.

According to the present invention, in the case where the rotational speed of the rotating electric machine suddenly changes in an electrical powered vehicle including a control device for generating an input/output power command value for a power storage device and a control device for controlling a power conversion device and a rotating electric machine, provided separately, excessive charging and excessive discharging of a power storage device induced by delay in modifying the input/output power command value caused by delay in transmission between control devices can be prevented.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the present invention will be described in detail hereinafter with reference to the drawings. In the drawings, the same or corresponding elements have the same reference characters allotted, and description thereof will not be repeated.

Figure 1:
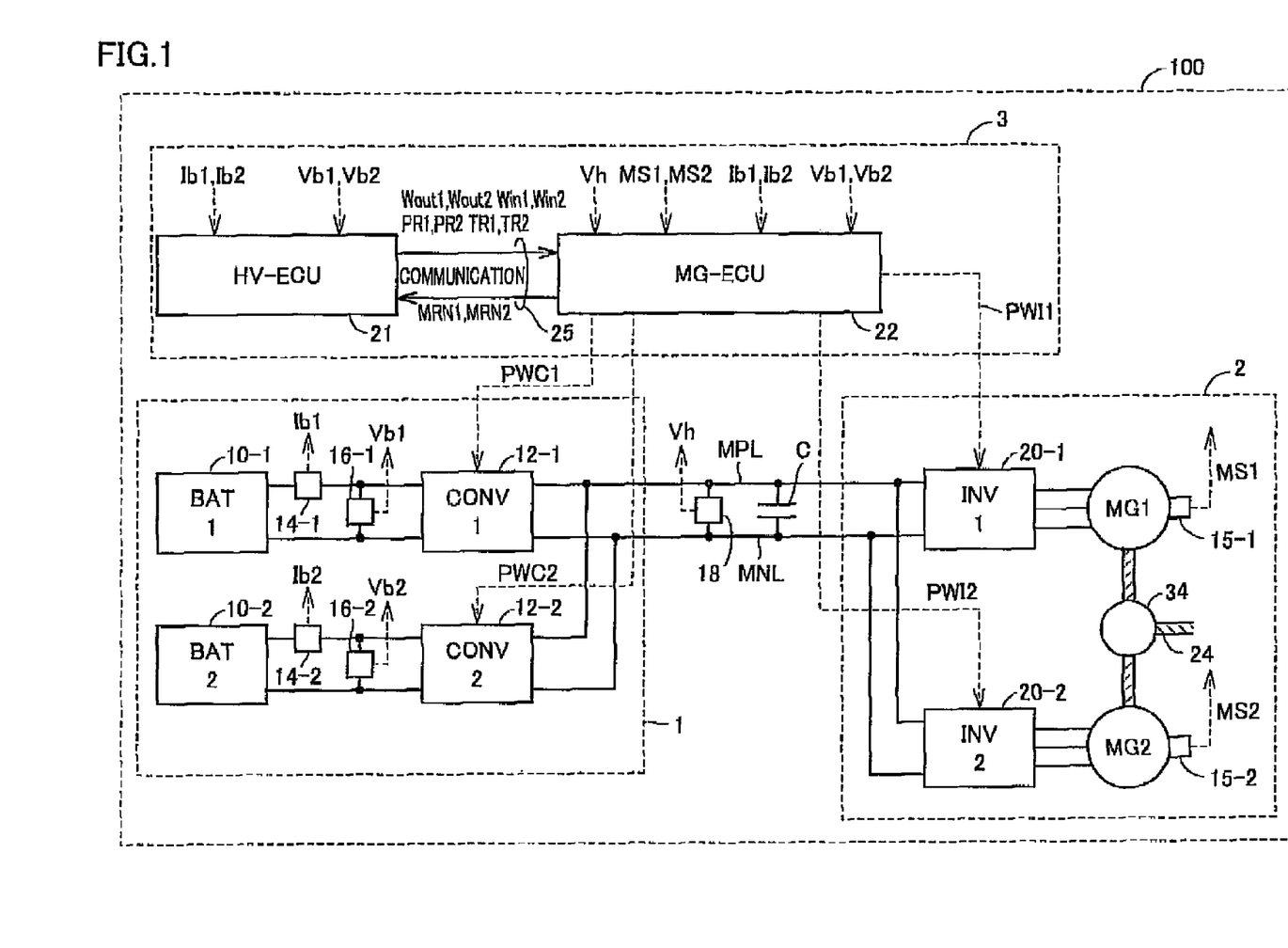
FIG. 1 is an entire block diagram of an electrical powered vehicle 100 according to an embodiment of the present invention.

FIG. 1 is an entire block diagram of an electrical powered vehicle 100 according to an embodiment of the present invention. The configuration of electrical powered vehicle 100 is not particularly limited as long as it can run by the power from a chargeable power storage device. Electrical powered vehicle 100 includes a hybrid vehicle, an electric vehicle, a fuel cell vehicle, and the like.

Referring to FIG. 1, electrical powered vehicle 100 includes a power generation unit 1, a driving force generation unit 2, a control unit 3 controlling both generation units, a smoothing capacitor C, and a voltage sensor 18.

Driving force generation unit 2 includes inverters 20-1 and 20-2, motor generators MG1 and MG2, a power transfer mechanism 34, a drive shaft 24, and angle sensors 15-1 and 15-2.

Inverters 20-1 and 20-2 are connected to a main positive line MPL and a main negative line MNL parallel to each other. Inverters 20-1 and 20-2 convert the driving power (DC power) supplied from main positive line MPL and main negative line MNL into AC power, based on driving signals PWI1 and PWI2 from MG-ECU 22 in control unit 3 for output to motor generators MG1 and MG2, respectively. Further, inverters 20-1 and 20-2 convert AC power generated by motor generators MG1 and MG2, respectively, into DC power, and provides the DC power to main positive line MPL and main negative line MNL as the regenerative power.

Motor generators MG1 and MG2 receive the AC power supplied from inverters 20-1 and 20-2, respectively, to generate a rotational driving force. Motor generators MG1 and MG2 receive externally applied rotation to generate AC power. Motor generators MG1 and MG2 are configured including a 3-phase AC rotating electric machine constituted by a rotor in which a permanent magnet is embedded, and a stator having a 3-phase coil arranged in a Y-connection. Motor generators MG1 and MG2 are coupled with power transfer mechanism 34, allowing the rotation driving force to be transmitted to a wheel (not shown) via drive shaft 24 coupled to power transfer mechanism 34.

In the case where electrical powered vehicle 100 is a hybrid vehicle, motor generators MG1 and MG2 are also coupled to an engine (not shown) via power transfer mechanism 34 or drive shaft 24. Control unit 3 executes control such that the power generated by the engine and the power generated by motor generators MG1 and MG2 attain an optimum ratio. One of motor generators MG1 and MG2 may be made to function as an electric motor exclusively, and the other of motor generators MG1 and MG2 as a generator exclusively.

Angle sensors 15-1 and 15-2 detect angular positions MS1 and MS2 of motor generators MG1 and MG2, and provide the detected values to MG-ECU 22, respectively. MG-ECU 22 can calculate rotational speeds MRN1 and MRN2 and angular speeds $\omega 1$ and $\omega 2$ of motor generators MG1 and MG2 based on angular positions MS1 and MS2. For an angle sensor, a resolver, or the like may be employed. Provision of angle sensors 15-1 and 15-2 may be dispensed with by directly calculating angular positions MS1 and MS2 from the motor voltage and/or current at MG-ECU 22. Power generation unit 1 includes power storage devices 10-1 and 10-2, converters 12-1 and 12-2, current sensors 14-1 and 14-2, and voltage sensors 16-1 and 16-2.

Power storage devices 10-1 and 10-2 are power reservoir elements configured to allow charging and discharging. Power storage devices 10-1 and 10-2 are configured including a power storage element such as a secondary battery of lithium ion battery or nickel hydrogen battery, an electrical double layer capacitor, and the like. Power storage device 10-1 is connected to converter 12-1. Power storage device 10-2 is connected to converter 12-2.

Converters 12-1 and 12-2 are connected to main positive line MPL and main negative line MNL arranged parallel to each other. Converter 12-1 carries out voltage conversion across power storage device 10-1 to main positive line MPL and main negative line MNL, based on a driving signal PWC1 from MG-ECU 22 located in control unit 3. Converter 12-2 carries out voltage conversion across power storage device 10-2 and main positive and negative lines MPL and MNL, respectively, based on a driving signal PWC2 from MG-ECU 22.

Current sensors 14-1 and 14-2 detect a current Ib1 input/output with respect to power storage device 10-1 and a current Ib2 input/output with respect to power storage device 10-2, respectively, and provide the detected values to MG-ECU 22 and HV-ECU 21 of control unit 3, respectively. Each of current sensors 14-1 and 14-2 detects the current (discharging current) output from a corresponding power storage device as a positive value, and the current (charging current) applied to a corresponding power storage device as a negative value, respectively. Although each of current sensors 14-1 and 14-2 are represented as detecting the current on a positive line, the current on a negative line may be detected instead.

Voltage sensors 16-1 and 16-2 detect a voltage Vb1 of power storage device 10-1 and a voltage VB2 of power storage device 10-2, respectively, and provide the detected values to MG-ECU 22 and HV-ECU 21, respectively.

Smoothing capacitor C is connected between main positive line MPL and main negative line MNL to reduce the power variation component included in main positive line MPL and main negative line MNL. Voltage sensor 18 detects a voltage Vh between main positive line MPL and main negative line MNL, and provides the detected value to MG-ECU 22.

Control unit 3 includes HV-ECU 21 and MG-ECU 22. HV-ECU 21 controls power storage devices 10-1 and 10-2 and the entire vehicle for generating an operation command for motor generators MG1 and MG2 and power storage devices 10-1 and 10-2. MG-ECU 22 controls converters 12-1 and 12-2, inverters 20-1 and 20-2, and motor generators MG1 and MG2 based on an operation command generated by HV-ECU 21. HV-ECU 21 and MG-ECU 22 are connected to each other through a communication line to allow transmission and reception of information with each other. MG-ECU 22 may be configured to be divided into a control device controlling converters and a control device controlling inverters/motor generators. The communication connection between HV-ECU 21 and MG-ECU 22 is not restricted in configuration as long as information can be transmitted and received with respect to each other, and may be established in a wired or wireless manner.

HV-ECU 21 and MG-ECU 22 include a CPU (Central Processing Unit), a storage device, an input/output buffer, and a communication device between the CPUs, all not shown. HV-ECU 21 and MG-ECU 22 carry out the input to each sensor, the output of a control command to respective devices, and also the transmission/reception of information bidirectionally by communication between the CPUs to control electrical powered vehicle 100 and respective devices. The control thereof is not limited by implementation in software, and may partially be implemented by developing dedicated hardware (electronic circuit).

HV-ECU 21 calculates an amount representing a state of charge (also referred to as SOC hereinafter) of each of power storage devices 10-1 and 10-2, charging/discharging power upper limits Win1 and Win2, Wout1 and Wout2, and input/output power command values PR1 and PR2 based on a detected value from each of current sensors 14-1 and 14-2 and voltage sensors 16-1, 16-2, and 18, as well as rotational speeds MRN1 and MRN2 of motor generators MG1 and MG2 transmitted from MG-ECU 22 through a communication line 25. Further, HV-ECU 21 calculates a vehicle required power based on a detection signal from each sensor not shown, a running state, an accelerator pedal position, and then calculates torque command values TR1 and TR2 of motor generators MG1 and MG2 based on the calculated vehicle required power. HV-ECU 21 transmits this information to MG-ECU 22 through communication line 25.

MG-ECU 22 provides driving signals PWI1 and PWI2 to inverters 20-1 and 20-2 such that the generated torque from motor generators MG1 and MG2 attains the level of torque command values TR1 and TR2 received from HV-ECU 21 to control inverters 20-1 and 20-2.

MG-ECU 22 detects rotational speeds MRN1 and MRN2 of motor generators MG1 and MG2 based on the signals from angle sensors 15-1 and 15-2 for output to HV-ECU 21 via communication line 25. MG-ECU 22 also generates driving signals PWC1 and PWC2 for driving converters 12-1 and 12-2, respectively, based on input/output power command values PR1 and PR2 transmitted from HV-ECU 21. MG-ECU 22 outputs generated driving signals PWC1 and PWC2 to converters 12-1 and 12-2, respectively, for control thereof.

At this stage, MG-ECU 22 generates driving signal PWC2 such that a charging/discharging power of power storage device 10-2 attains the level of an input/output power command value PR2 that is the target power for converter 12-2. For converter 12-1, MG ECU 22 generates driving signal PWC1 such that a voltage Vh between main positive line MPL and main negative line MNL attains a predetermined target voltage.

Further, MG-ECU 22 calculates an amount of change in rotational speed MRN2 of motor generator MG2 within a predetermined time (for example, sampling timing×n times (n: natural number) of MG-ECU 22). MG-ECU 22 compares this amount of change of the rotational speed with a predetermined threshold value to sense a sudden change in the rotational speed of motor generator MG2. Corresponding to the detection of a sudden change in the rotational speed, MG-ECU 22 corrects the input/output power command value of each power storage device, as will be described afterwards.

Figure 2:
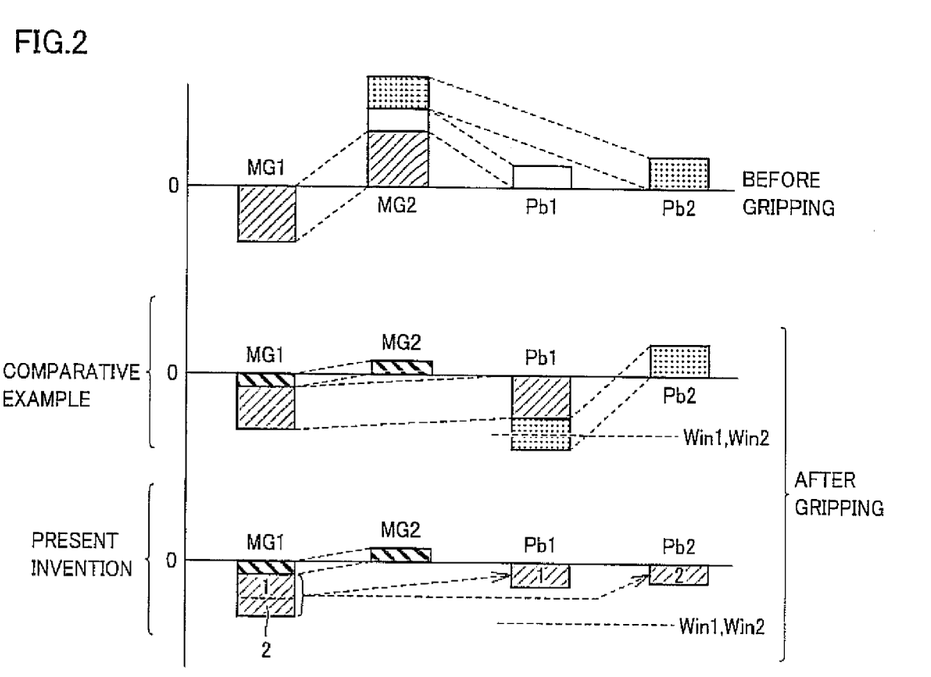
FIG. 2 schematically represents a correction process of an input/output power command value by a MG-ECU 22 of the present embodiment.

The concept of the process of correcting an input/output power command value by MG-ECU 22 will be described hereinafter with reference to FIG. 2. It is assumed that motor generator MG1 functions as a power generator that can generate power using the engine output, and motor generator MG2 functions as an electric motor driving a drive wheel. FIG. 2 is based on the case where the driving wheel takes a "gripping" state as an event of a sudden change in rotational speed MRN2 of motor generator MG2.

In FIG. 2, the labels of "MG1" and "MG2" represent the power of motor generators MG1 and MG2, respectively. "Pb1" and "Pb2" represent the charging/discharging power of power storage devices 10-1 and 10-2, respectively. The positive side of the vertical axis represents power consumption and discharging power. The negative side represents the generated power and charging power.

Also in FIG. 2, the top section represents a state prior to gripping, and the middle section and bottom section represent the state after gripping. The bottom section represents the case where a correcting process of the input/output power command value according to the present embodiment is carried out, comparative to the middle section where such a correction process is not carried out.

Prior to gripping, motor generator MG1 generates power by the engine output. The output from motor generator MG2 is greater than the power generated by motor generator MG1, so that the insufficient power is compensated for by power storage devices 10-1 and 10-2 (top section in FIG. 2).

When the driving wheel attains a gripping state from the above-described state, the rotational speed of the driving wheel is abruptly reduced, which results in a lower power consumption of motor generator MG2. Accordingly, the power generated from motor generator MG1 is not consumed at driving force generation unit 2. The extra generated power will flow from driving force generation unit 2 to power storage devices 10-1 and 10-2.

At this stage, it is desirable that this change in the output from driving force generation unit 2 is immediately reflected in the power distribution control towards power storage devices 10-1 and 10-2. It is to be noted that the detection of rotational speed MRN2 of motor generator MG2 is carried out by MG-ECU 22, whereas the command value of the output torque of motor generator MG2 is provided by HV-ECU 21. This means that the delay in communication between the ECUs will induce time delay at HV-ECU 21 before a sudden change in the rotational speed of motor generator MG2 is detected. The event of the change in output at driving force generation unit 2 not being immediately reflected in the power distribution control towards power storage devices 10-1 and 10-2 will occur. Accordingly, the power generated at motor generator MG1 and the power discharged from power storage device 10-2 will flow to power storage device 10-1, leading to the possibility that the charging power at power storage device 10-1 exceeds charging power upper limit Win1 of power storage device 10-1 (middle section in FIG. 2).

In the present embodiment, when the rotational speed of motor generator MG2 that drives the wheel suddenly changes, MG-ECU 22 that detects the rotational speed MRN2 of motor generator MG2 corrects the input/output power command value transmitted from HV-ECU 21 such that power is distributed towards each power storage device corresponding to the change in the output of driving force generation unit 2. Therefore, before HV-ECU 21 modifies the input/output power command value upon detecting a sudden change in the rotational speed of motor generator MG2, the input/output power command value can be modified promptly by MG-ECU 22 without having to wait for modification of the input/output power command value from HV-ECU 21. Therefore, the event of the charging/discharging power of a power storage device attaining an excessive level due to delay in transmission between control devices can be prevented (bottom section in FIG. 2).

Figure 3:
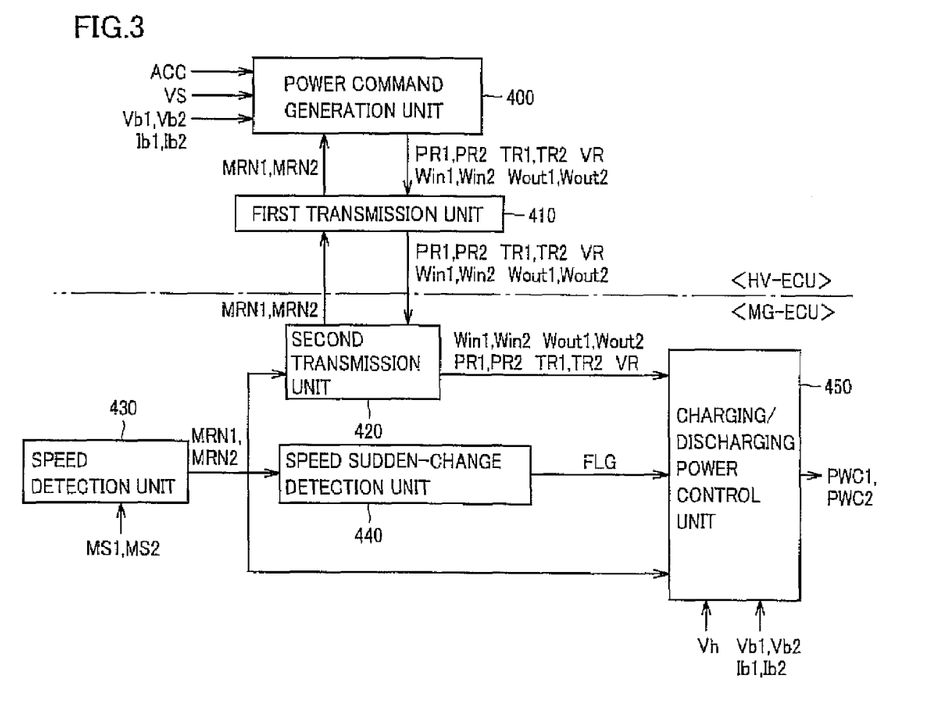
FIG. 3 is a functional block diagram of a control configuration related to a correction process of an input/output power command value executed by a control unit 3 according to the present embodiment.

HV-ECU 21 and MG-ECU 22 in control unit 3 will be described in detail hereinafter with reference to FIG. 3. FIG. 3 is a functional block diagram representing a control configuration related to the correction process of an input/output power command value executed by control unit 3 according to the present embodiment.

Referring to FIG. 3, HV-ECU 21 includes a power command generation unit 400 and a first transmission unit 410. MG-ECU 22 includes a second transmission unit 420, a speed detection unit 430, a speed sudden-change detection unit 440, and a charging/discharging power control unit 450. Each functional block shown in FIG. 3 is implemented by executing a program prestored in each CPU (not shown) in HV-ECU 21 and MG-ECU 22. Alternatively, the function of each block may be implemented by an electronic circuit (hardware) mounted so as to implement a function corresponding to each block.

Power command generation unit 400 of HV-ECU 21 calculates SOC1 that is the state of charge of power storage device 10-1 and charging/discharging power upper limits Win1 and Wout1 based on detected values from current sensor 14-1 and voltage sensor 16-1. Similarly, power command generation unit 400 calculates SOC2 that is the state of charge of power storage device 10-2 and charging/discharging power upper limits Win2 and Wout2 based on detected values from current sensor 14-2 and voltage sensor 16-2. Power command generation unit 400 receives an accelerator pedal position signal ACC representing the control input of the accelerator pedal by an accelerator pedal position sensor (not shown), and a vehicle speed signal VS representing the vehicle speed from a vehicle speed sensor (not shown) to calculate a vehicle required power of driving force generation unit 2.

Based on this vehicle required power, power command generation unit 400 carries out distribution-control towards motor generators MG1 and MG2 taking into account the charging power represented by SOC1 and SOC2 of respective power storage devices set forth above as well as charging/discharging power upper limits Win1, Win2 and Wout1, Wout2 of power storage devices 10-1 and 10-2. In the case of a hybrid vehicle, power distribution towards the engine is carried out in addition towards motor generators MG1 and MG2. Based on the required power split among motor generators MG1 and MG2 and rotational speeds MRN1 and MRN2 of motor generators MG1 and MG2 transmitted from MG-ECU 22, power command generation unit 400 sets torque command values TR1 and TR2 for motor generators MG1 and MG2.

In addition, power command generation unit 400 determines the distribution ratio between power storage devices 10-1 and 10-2 with regards to the total power input/output for a power storage device based on the state of charge SOC1 and SOC2 of each power storage device. Each of input/output power command values PR1 and PR2 for power storage devices 10-1 and 10-2 is determined based on the total power and distribution ratio. According to the driving state of motor generators MG1 and MG2, a target voltage VR for voltage Vh between main positive line MPL and main negative line MNL is generated.

First transmission unit 410 in HV-ECU 21 receives rotational speeds MRN1 and MRN2 of motor generators MG1 and MG2 transmitted from MG-ECU 22 for output to power command generation unit 400. First transmission unit 410 also transmits the aforementioned information generated at power command generation unit 400 towards MG-ECU 22.

At MG-ECU 22, speed detection unit 430 receives the signals of the angle sensors of motor generators MG1 and MG2 to calculate rotational speeds MRN1 and MRN2 of motor generators MG1 and MG2. Speed detection unit 430 provides rotational speeds MRN1 and MRN2 to second transmission unit 420, speed sudden-change detection unit 440, and charging/discharging power control unit 450.

Second transmission unit 420 transmits rotational speeds MRN1 and MRN2 of motor generators MG1 and MG2 applied from speed detection unit 430 to HV-ECU 21, and receives the state of charge, command value, and the like transmitted from HV-ECU 21 for output to charging/discharging power control unit 450.

Speed sudden-change detection unit 440 determines whether the change in the rotational speed of motor generator MG2 applied from speed detection unit 430 over a predetermined time (for example, sampling time×n times (n: natural number) of MG-ECU 22) exceeds a predetermined threshold value or not. When the change in the rotational speed exceeds the predetermined threshold value, speed sudden-change detection unit 440 turns on and provides to charging/discharging power control unit 450 a speed sudden-change flag FLG in response to occurrence of the sudden change. In the case where the change in the rotational speed does not exceed the threshold value, speed sudden-change detection unit 440 turns off speed sudden-change flag FLG, which information is output to charging/discharging power control unit 450.

A rotational speed change in the positive direction, i.e. a sudden change in the increasing direction of the rotational speed, implies that slipping has occurred at the driving wheel. In the case where the rotational speed change is negative, gripping has occurred at the driving wheel.

Charging/discharging power control unit 450 receives charging/discharging power upper limits Win1, Win2 and Wout1, Wout2 of power storage devices 10-1 and 10-2, input/output power command values PR1 and PR2 of power storage devices 10-1 and 10-2, torque command values TR1 and TR2 for motor generators MG1 and MG2, and target voltage VR of voltage Vh between main positive line MPL and main negative line MNL, transmitted from HV-ECU 21 via a second transmission unit 420. Charging/discharging power control unit 450 also receives rotational speeds MRN1 and MRN2 of motor generators MG1 and MG2 from speed detection unit 430, and speed sudden-change flag FLG from speed sudden-change detection unit 440, as well as detected values from voltage sensors 16-1, 16-2 and 18, and current sensors 14-1 and 14-2.

When speed sudden-change flag FLG is OFF, charging/discharging power control unit 450 sets input/output power command values PR1 and PR2 of each power storage device generated at HV-ECU 21 as target powers PRF1 and PRF2, and then generates and outputs control command values PWC1 and PWC2 towards converters 12-1 and 12-2 such that the switching element for power conversion at converters 12-1 and 12-2 is controlled according to target powers PRF1 and PRF2.

When speed sudden-change flag FLG is ON, charging/discharging power control unit 450 calculates the power generated and consumed at motor generators MG1 and MG2 based on torque command values TR1 and TR2 for motor generators MG1 and MG2 and rotational speeds MRN1 and MRN2 of motor generators MG1 and MG2. As will be described afterwards, the input/output power command value for each power storage device is corrected based on the ratio of input/output power command values PR1 and PR2 of each power storage device and charging/discharging power upper limits Win1, Win2 and Wout1, Wout2. Then, charging/discharging power control unit 450 sets the corrected input/output power command value as the target powers PRF1 and PRF2 for each power storage device to control converters 12-1 and 12-2.

Figure 4:
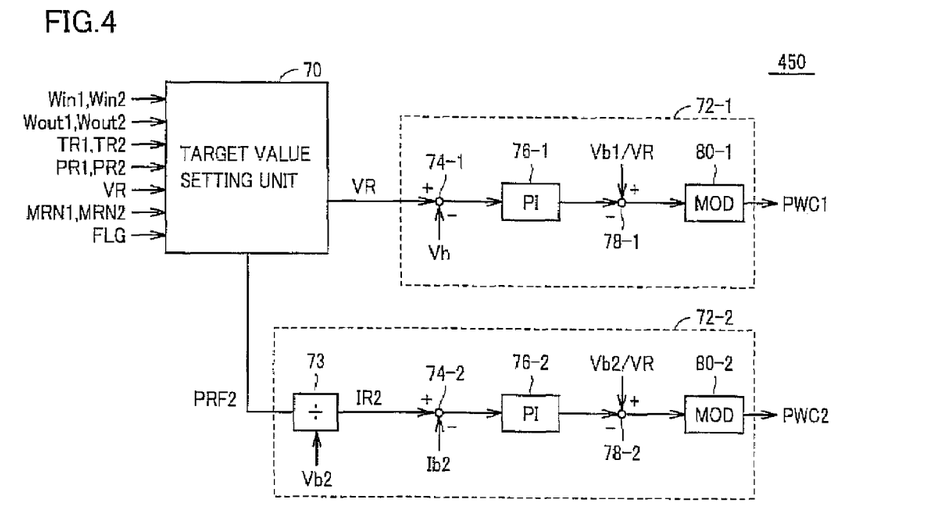
FIG. 4 is a detailed functional block diagram of a charging/discharging power control unit 450 of the present embodiment.

FIG. 4 is a detailed functional block diagram of charging/discharging power control unit 450. Referring to FIG. 4, charging/discharging power control unit 450 includes a target value setting unit 70, a voltage control unit 72-1, and a current control unit 72-2.

Target value setting unit 70 sets input/output power command values PRF1 and PRF2 for each power storage device based on the state of speed sudden-change flag FLG, and also sets target voltage VR of voltage Vh between main positive line MPL and main negative line MNL.

Voltage control unit 72-1 includes subtracters 74-1 and 78-1, a PI controller 76-1, and a modulator 80-1. Subtracter 74-1 subtracts voltage Vh from target voltage VR and provides the calculated result to PI controller 76-1. PI controller 76-1 carries out proportional and integral operation with the deviation between target voltage VR and voltage Vh as the input, and provides the calculated result to subtracter 78-1.

Subtracter 78-1 subtracts the output of PI controller 76-1 from the reciprocal of the theoretical boosting ratio of converter 12-1 represented by voltage Vb1/target voltage VR, and provides the calculated result to modulator 80-1 as the duty command of converter 12-1. Modulator 80-1 generates a driving signal PWC1 based on the duty command from subtracter 78-1 and a carrier wave generated by an oscillator not shown. The generated driving signal PWC1 is output to converter 12-1.

Current control unit 72-2 includes a divider 73, subtracters 74-2 and 78-2, a PI controller 76-2, and a modulator 80-2. Divider 73 divides input/output power command value PRF2 of power storage device 10-2 by voltage Vb2 to calculate a current command value IR2.

Subtracter 74-2 subtracts current Ib2 from current command value IR2, and provides the calculated result to PI controller 76-2. PI controller 76-2 carries out proportional and integral operation with the deviation between current command value IR2 and current Ib2 as the input, and provides the calculated result to subtracter 78-2.

Subtracter 78-2 subtracts the output of PI controller 76-2 from the reciprocal of the theoretical boosting ratio of converter 12-2 represented by voltage Vb2/target voltage VR, and provides the calculated result to modulator 80-2 as the duty command of converter 12-2. Modulator 80-2 generates a driving signal PWC2 based on the duty command from subtracter 78-2 and a carrier wave generated by an oscillator not shown to provide the generated driving signal PWC2 to converter 12-2.

In the present embodiment, there are two power storage devices. By employing converter 12-2 as the current control converter for current control (power control), and providing control such that the charging/discharging power of corresponding power storage device 10-2 attains target power PRF2, the charging/discharging power of the remaining power storage device 10-1 can be set at target power PRF1. The above description is based on the case where converter 12-1 is taken as the voltage control converter and converter 12-2 is taken as the current control converter. Conversely, converter 12-1 may be set as the current control converter and converter 12-2 as the voltage control converter.

Figure 5:
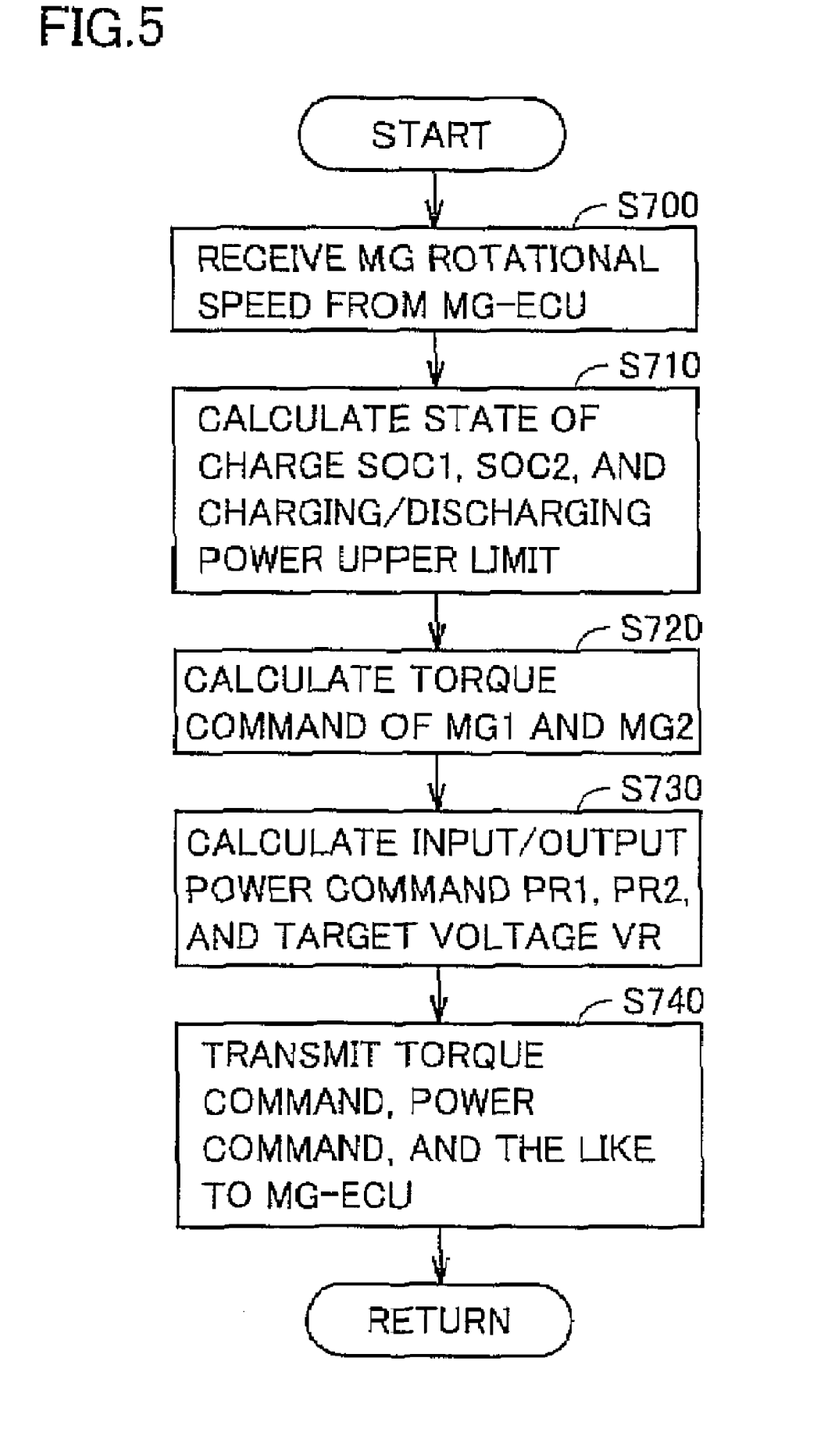
FIG. 5 is a flowchart representing a control procedure by an HV-ECU 21 in a correction process of an input/output power command value according to the present embodiment.
Figure 6:
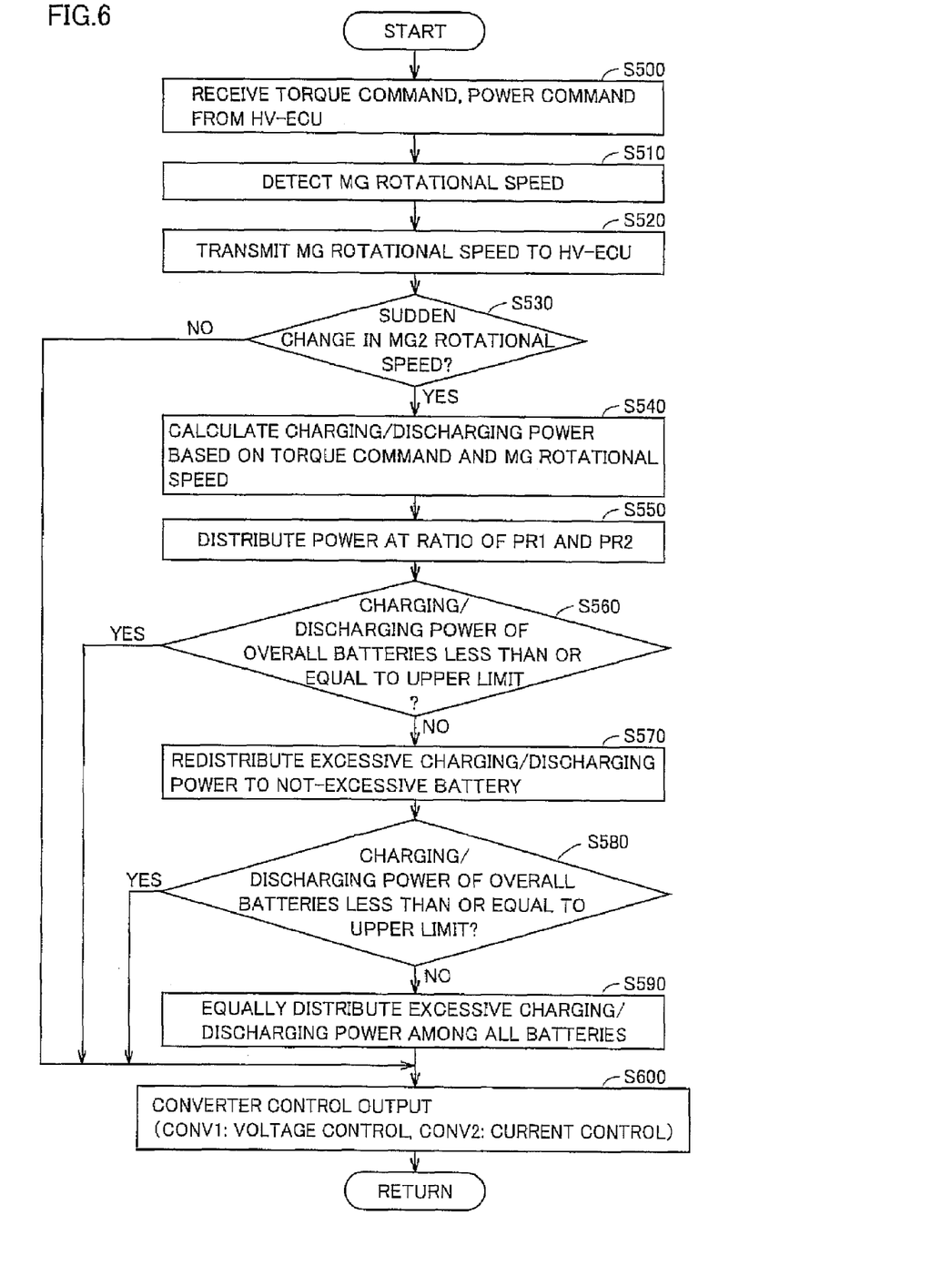
FIG. 6 is a flowchart representing a control procedure by MG-ECU 22 in a correction process of an input/output power command value according to the present embodiment.

FIGS. 5 and 6 are flowcharts representing the control procedure of the correction process of the input/output power command value shown in FIG. 3. The flowchart of FIG. 5 corresponds to the procedure carried out at HV-ECU 21, whereas the flowchart of FIG. 6 corresponds to the procedure carried out at MG-ECU 22. The flowcharts are implemented by executing a program, prestored in HV-ECU 21 and MG-ECU 22 that are the control devices of the present embodiment, repeatedly in a predetermined cycle time (for example 10 ms).

Referring to FIG. 5, at a step (hereinafter, "step" abbreviated as S) 700, HV-ECU 21 receives rotational speeds MRN1 and MRN2 of motor generators MG1 and MG2 detected by MG-ECU 22 through communication.

At S710-S730, HV-ECU 21 carries out a process corresponding to the function of power command generation unit 400 set forth above to generate charging/discharging power upper limits Win1, Win2 and Wout1, Wout2, input/output power command values PR1 and PR2 of power storage devices 10-1 and 10-2, torque command values TR1 and TR2 for motor generators MG1 and MG2, and target voltage VR of voltage Vh between main positive line MPL and main negative line MNL.

Then, HV-ECU 21 transmits the command values and target values calculated at S710-S730 to MG-ECU 22 (S740).

Referring to FIG. 6, MG-ECU 22 receives the command values and target values transmitted from HV-ECU 21 at S500.

Then, MG-ECU 22 detects rotational speeds MRN1 and MRN2 of motor generators MG1 and MG2 based on the detected values from angle sensors 15-1 and 15-2 at S510, and transmits these rotational speeds MRN1 and MRN2 to HV-ECU 21 at S520.

At S530, MG-ECU 22 determines whether the rotational speed of motor generator MG2 has suddenly changed. Specifically, MG-ECU 22 calculates the amount of change of the rotational speed of motor generator MG2 over the sampling time of n times (n: natural number), and determines that a sudden change has occurred when the absolute value of this amount of change exceeds a predetermined threshold value. A positive amount of change implies slipping and a negative amount of change implies gripping.

When the rotational speed of motor generator MG2 has not suddenly changed (NO at S530), control skips to S600 where MG-ECU 22 controls converters 12-1 and 12-2 based on target voltage VR and input/output power command values PR1 and PR2 of each power storage device, transmitted from HV-ECU 21, as target powers PRF1 and PRF2. At this stage, MG-ECU 22 carries out voltage-control on converter 12-1 such that voltage Vh attains the level of target voltage VR, and carries out current-control on converter 12-2 such that the charging/discharging power of converter 12-2 attains the level of target power PR2.

In the case where a determination is made that the rotational speed of motor generator MG2 has made a sudden change at S530 (YES at S530), control proceeds to S540 where MG-ECU 22 calculates the input/output power of motor generators MG1 and MG2 based on torque command values TR1 and TR2 of motor generators MG1 and MG2 received from HV-ECU 21 and rotational speeds MRN1 and MRN2 of motor generators MG1 and MG2 detected at S520. By adding these values, the total charging/discharging power at power storage devices 10-1 and 10-2 reflecting the state of sudden-change in the rotational speed can be obtained.

Then, MG-ECU 22 distributes the total charging/discharging power reflecting the sudden-change state of the rotational speed calculated at S540 among respective power storage devices based on the ratio of input/output power command values PR1 and PR2 received from HV-ECU 21 to correct the input/output power command value for each of power storage devices 10-1 and 10-2 (S550).

MG-ECU 22 determines whether the corrected input/output power command value calculated at S550 is less than or equal to charging/discharging power upper limits Win1, Win2 and Wout1, Wout2 (S560). At this stage, MG-ECU 22 compares with Win1 and Win2 for the charging power and with Wout1 and Wout2 for the discharging power.

When the corrected input/output power command value is less than or equal to the charging/discharging power upper limit (YES at S560), MG-ECU 22 controls converters 12-1 and 12-2 based on target voltage VR and the corrected input/output power command values set forth above as target powers PRF1 and PRF2 (S600).

When any of the corrected input/output power command values exceeds the charging/discharging power upper limit (NO at S560), MG-ECU 22 adds the exceeding power to the other command value not exceeding the charging/discharging power upper limit to recorrect the input/output power command value (S570).

Then, MG-ECU 22 determines again whether the input/output power command value recorrected at S570 is less than or equal to charging/discharging power upper limits Win1, Win2 and Wout1 and Wout2 (S580).

When all the recorrected input/output power command values are less than or equal to the charging/discharging power upper limit (YES at S580), control skips to S600 where MG-ECU 22 controls converters 12-1 and 12-2 based on target voltage VR and input/output power command values PR1 and PR2 as target powers PRF1 and PRF2.

A NO result at S580 corresponds to the state where one of the input/output power command values after recorrection is equal to the charging/discharging power upper limit and the other exceeds the charging/discharging power upper limit. Accordingly, MG-ECU 22 distributes the power exceeding the charging/discharging power upper limit, from the charging/discharging power, to power storage devices 10-1 and 10-2 such that the exceeding power at each power storage device is equal, and further corrects the input/output power command value (S590). At S600, MG-ECU 22 controls converters 12-1 and 12-2 based on target voltage VR, and target powers PRF1 and PRF2 that are the final corrected input/output power command values. Accordingly, concentration of excessive charging/discharging power at a certain power storage device can be prevented.

When both of the power storage devices have a corrected input/output power command value that exceeds the charging/discharging power upper limit at S560, S570-S580 may be skipped to proceed to S590.

By executing the control process at HV-ECU 21 and MG-ECU 22 according to the flowcharts of FIGS. 5 and 6, the correction process of the input/output power command values according to the present embodiment corresponding to FIG. 3 can be realized.

Figure 7A:
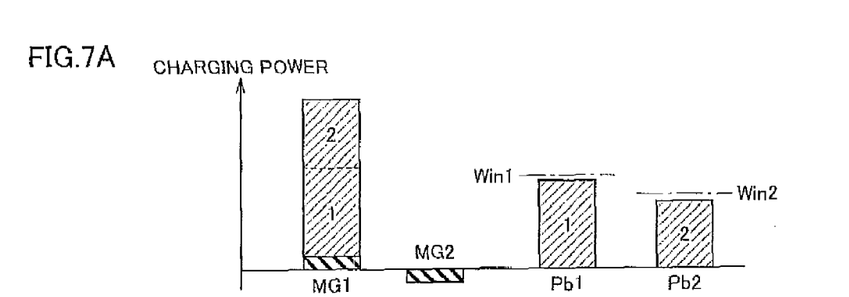
FIGS. 7A-7C are diagrams to describe a state of charge of power storage devices 10-1 and 10-2 when a correction process of an input/output power command value by MG-ECU 22 is applied according to the present embodiment.
Figure 7B:
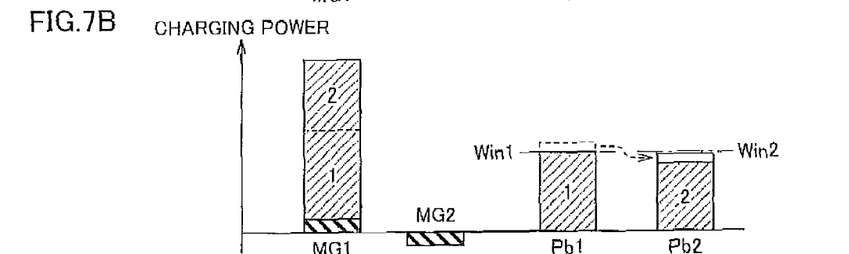
Figure 7C:
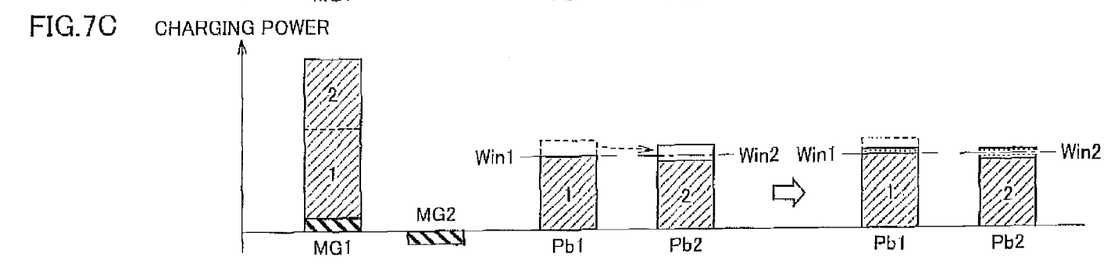

The state of charge with respect to power storage devices 10-1 and 10-2 when the input/output power command value correction process of the present embodiment is applied will be described hereinafter with reference to FIGS. 7A-7C. FIGS. 7A-7C correspond to the case of charging power when the driving wheel attains a gripping state, taking the generated power and charging power as a positive value.

Referring to FIG. 7A, when the driving wheel attains a gripping state and a sudden change in the rotational speed of motor generator MG2 is detected at MG-ECU 22, MG-ECU 22 calculates the power generated/consumed at driving force generation unit 2 based on current torque command values TR1 and TR2 of motor generators MG1 and MG2 received from HV-ECU 21, and rotational speeds MRN1 and MRN2 of motor generators MG1 and MG2 detected at MG-ECU 22. This calculated power value reflects the sudden change in the rotational speed. By adding this value, MG-ECU 22 calculates the total charging/discharging power for the power storage devices.

MG-ECU 22 corrects the input/output power command value to be distributed to each of power storage devices 10-1 and 10-2 based on the calculated total charging/discharging power and the ratio of input/output power command values PR1 and PR2 of power storage devices 10-1 and 10-2 at the time of transmission from HV-ECU 21. When the corrected input/output power command value distributed to power storage device 10-1 and the corrected input/output power command value distributed to power storage device 10-2 are less than or equal to charging power upper limits Win1 and Win2 of each power storage device, MG-ECU 22 generates driving commands PWC1 and PWC2 for converters 12-1 and 12-2 with the calculated corrected input/output power command values as target powers PRF1 and PRF2 to be charged to power storage devices 10-1 and 10-2, and controls each converter.

FIG. 7B corresponds to the case where the charging power distributed according to the ratio of input/output power command values PR1 and PR2 of each power storage device exceeds the charging power upper limit of a certain power storage device.

Referring to FIG. 7B, the input/output power command value towards power storage device 10-1 exceeds charging power upper limit Win1 when the power is distributed according to the ratio of input/output power command values PR1 and PR2 of each power storage device. In this case, MG-ECU 22 corrects the input/output power command value such that the exceeded power is distributed to the power storage device having room for charging power (in this case, power storage device 10-2).

When the corrected input/output power command value towards power storage device 10-2 does not exceed charging power upper limit Win2, MG-ECU 22 generates driving commands PWC1 and PWC2 towards converters 12-1 and 12-2 with the corrected charging power as target powers PRF1 and PRF2 to control each converter.

The case where the corrected input/output power command value towards power storage device 10-2 exceeds charging power upper limit Win2 will be described hereinafter with reference to FIG. 7C.

Referring to FIG. 7C, likewise with FIG. 7B, when the power exceeded at power storage device 10-1 is distributed to power storage device 10-2, there may be a case where the input/output power command value exceeds charging power upper limit Win2, depending upon the state of charge of power storage device 10-2. In this case, both of power storage devices 10-1 and 10-2 will be greater than or equal to the charging power upper limit.

If the exceeded power is concentrated at a certain power storage device in such a case, significant damage may be inflicted on that certain power storage device. Therefore, MG-ECU 22 corrects the power for redistribution such that the exceeding power at each of power storage devices 10-1 and 10-2 is equal. Then, using the corrected charging power as target powers PRF1 and PRF2, MG-ECU 22 generates driving commands PWC1 and PWC2 for converters 12-1 and 12-2 to control each converter. When both of power storage devices 10-1 and 1-2 exceed the charging/discharging power upper limit at the first correction of the input/output power command value described with reference to FIG. 7A, the exceeding power may be distributed equally to each power storage device as described with reference to FIG. 7C, without carrying out the correction described in association with FIG. 7B.

Although the above description corresponds to preventing excessive charging in the event of gripping, excessive discharging at a power storage device in the event of slipping occurring at the driving wheel can be prevented based on a similar concept.

Thus, by detecting a sudden change in the rotational speed of motor generator MG2 and correcting the input/output power command value at MG-ECU 22, excessive charging/discharging of a power storage device can be prevented.

According to an electrical powered vehicle and control method therefor of the present embodiment, in an electrical powered vehicle having a control device (HV-ECU 21) generating an input/output power command value of a power storage device and a control device (MG-ECU 22) controlling the power conversion device and rotating electric machine, provided separately, input/output power command values PR1 and PR2 for power storage devices 10-1 and 10-2 can be corrected at MG-ECU 22 when a sudden change in the rotational speed of the rotating electric machine is detected by speed sudden-change detection unit 440 of MG-ECU 22. Accordingly, the input/output power command value for power storage devices 10-1 and 10-2 can be set promptly in response to a sudden change in the rotational speed at MG-ECU 22 without having to wait for the intrinsic modification of input/output power command values PR1 and PR2 for power storage devices 10-1 and 10-2 set at HV-ECU 21. Therefore, excessive charging of a power storage device induced by delay in modification of the command value caused by transmission delay between the control devices can be prevented.

Further, in the case where the rotational speed of the rotating electric machine is suddenly changed in the electrical powered vehicle set forth above, concentration of excessive charging/discharging power at a certain power storage device induced by delay in modifying the command value caused by transmission delay between control devices can be prevented.

Figure 8:
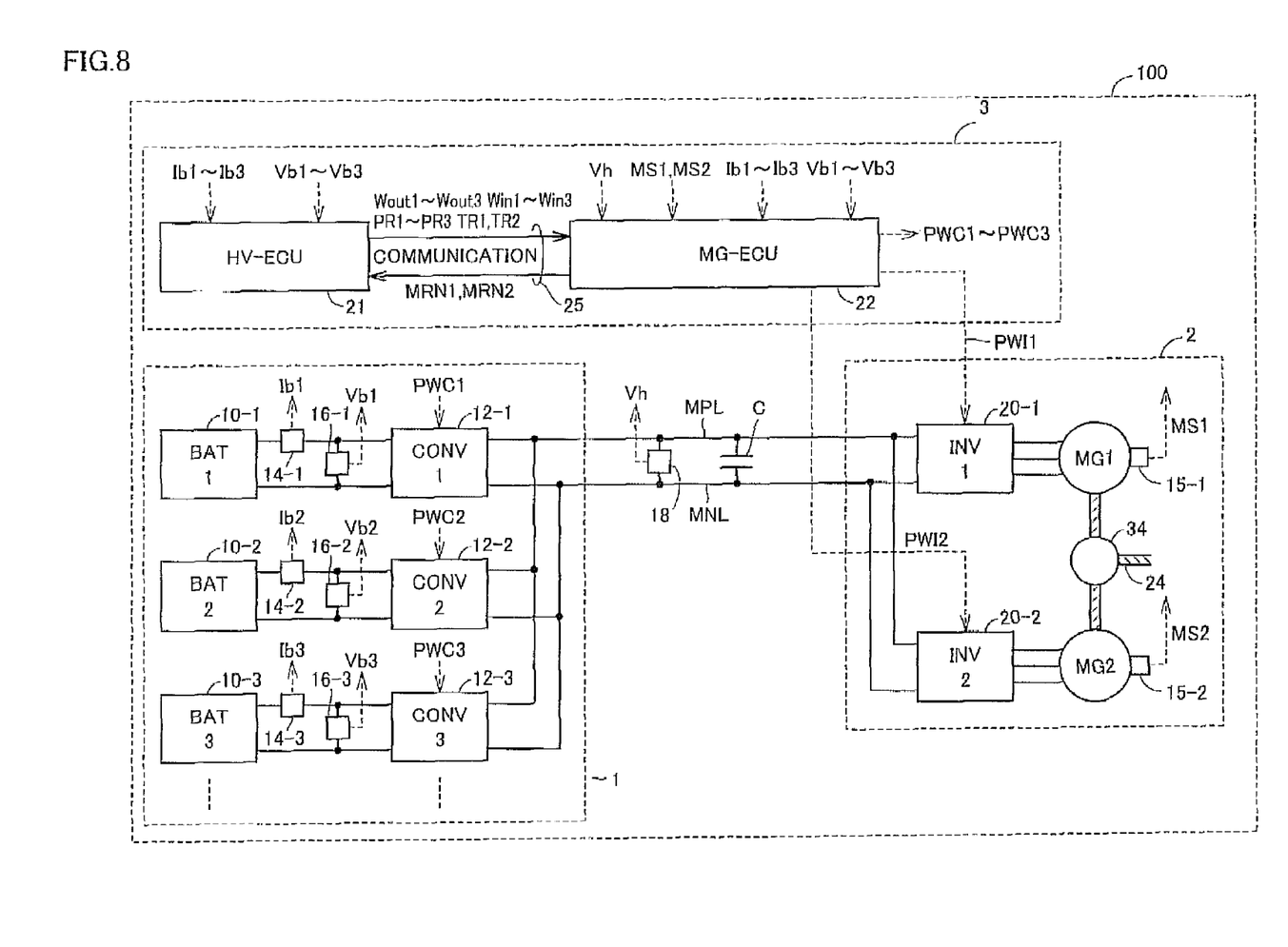
FIG. 8 is an entire block diagram of electrical powered vehicle 100 representing a modification of the present embodiment.

The present embodiment has been described based on power generation unit 1 including two power storage devices and two corresponding converters. However, power generation unit 1 may include three or more power storage devices and corresponding converters, as shown in FIG. 8. In this case, one converter is subjected to voltage-control, and the remaining converters are subjected to current-control. Accordingly, power control of each power storage device is allowed in a manner similar to that set forth above. In the correction process of the input/output power command value, the exceeding power may be distributed according to the ratio of the chargeable power of a power storage device not yet exceeding, or in an equal-distribution manner.

In the description set forth above, HV-ECU 21 and MG-ECU 22 correspond to "first control device" and "second control device", respectively, in the present invention. Converters 12-1 and 12-2 and inverters 20-1 and 20-2 correspond to "power conversion device" of the present invention, wherein converter 12-1 corresponds to "voltage control converter" and converter 12-2 corresponds to "current control converter". Further, main positive line MPL and main negative line MNL correspond to "power line" of the present invention.

Although the present invention has been described and illustrated in detail, it is clearly understood that the same is by way of illustration and example only and is not to be taken by way of limitation, the scope of the present invention being interpreted by the terms of the appended claims.

FIG. 1
COMMUNICATION
FIG. 2
BEFORE GRIPPING
COMPARATIVE EXAMPLE
AFTER GRIPPING
PRESENT INVENTION
FIG. 3
400 POWER COMMAND GENERATION UNIT
410 FIRST TRANSMISSION UNIT
420 SECOND TRANSMISSION UNIT
430 SPEED DETECTION UNIT
440 SPEED SUDDEN-CHANGE DETECTION UNIT
450 CHARGING/DISCHARGING POWER CONTROL UNIT
FIG. 4
70 TARGET VALUE SETTING UNIT
FIG. 5
START
S700 RECEIVE MG ROTATIONAL SPEED FROM MG-ECU
S710 CALCULATE STATE OF CHARGE SOC1, SOC2, AND CHARGING/DISCHARGING POWER UPPER LIMIT
S720 CALCULATE TORQUE COMMAND OF MG1 AND MG2
S730 CALCULATE INPUT/OUTPUT POWER COMMAND PR1, PR2, AND TARGET VOLTAGE VR
S740 TRANSMIT TORQUE COMMAND, POWER COMMAND, AND THE LIKE TO MG-ECU
RETURN
FIG. 6
START
S500 RECEIVE TORQUE COMMAND, POWER COMMAND FROM HV-ECU
S510 DETECT MG ROTATIONAL SPEED
S520 TRANSMIT MG ROTATIONAL SPEED TO HV-ECU
S530 SUDDEN CHANGE IN MG2 ROTATIONAL SPEED?
S540 CALCULATE CHARGING/DISCHARGING POWER BASED ON TORQUE COMMAND AND MG ROTATIONAL SPEED
S550 DISTRIBUTE POWER AT RATIO OF PR1 AND PR2
S560 CHARGING/DISCHARGING POWER OF OVERALL BATTERIES LESS THAN OR EQUAL TO UPPER LIMIT?
S570 REDISTRIBUTE EXCESSIVE CHARGING/DISCHARGING POWER TO NOT-EXCESSIVE BATTERY
S580 CHARGING/DISCHARGING POWER OF OVERALL BATTERIES LESS THAN OR EQUAL TO UPPER LIMIT?
S590 EQUALLY DISTRIBUTE EXCESSIVE CHARGING/DISCHARGING POWER AMONG ALL BATTERIES
S600 CONVERTER CONTROL OUTPUT
CONV1: VOLTAGE CONTROL, CONV2: CURRENT CONTROL
RETURN
FIGS. 7A, 7B, 7C
CHARGING POWER
FIG. 8
COMMUNICATION

What is claimed is:

1. An electrical powered vehicle comprising:
a rotating electric machine configured to allow input and output of motive power with a drive shaft of the vehicle,
a plurality of power storage devices provided in parallel,
a power conversion device carrying out bidirectional power conversion between said rotating electric machine and said plurality of power storage devices,
a first control device generating an operation command value of said rotating electric machine and said plurality of power storage devices, and
a second control device configured to allow transmission and reception of information mutually with said first control device, for controlling said power conversion device such that said rotating electric machine and said plurality of power storage devices are operated according to said operation command value,
said second control device including
a speed detection unit detecting a rotational speed of said rotating electric machine based on an output from a sensor provided at said rotating electric machine, and
a speed sudden-change detection unit detecting a sudden change in said rotational speed based on a detected result of said speed detection unit,
said first control device including a power command generation unit generating a plurality of input/output power command values for said plurality of power storage devices, respectively, according to an input and output power of said rotating electric machine based on said rotational speed detected by said speed detection unit, and a state of charge of each of said plurality of power storage devices, said second control device further including a charging/discharging power control unit controlling charging and discharging of said plurality of power storage devices through said power conversion device, according to said plurality of input/output power command values from said first control device set by said power command generation unit when said speed sudden-change detection unit does not detect said sudden change, and controlling charging and discharging of said plurality of power storage devices through said power conversion device by correcting at least a portion of said plurality of input/output power command values from said first control device so as to reflect a change in said rotational speed when said speed sudden-change detection unit detects said sudden change.

2. The electrical powered vehicle according to claim 1, wherein
said power conversion device includes
a plurality of converters connected between a power line and respective said plurality of power storage devices, each converter configured to carry out bidirectional power conversion between a corresponding power storage device and said power line, and
an inverter configured to carry out bidirectional power conversion between said power line and said rotating electric machine,
said plurality of converters is classified into one voltage control converter and a balance of at least one current control converter,
said charging/discharging power control unit includes
a voltage controller controlling said voltage control converter such that a voltage of said power line attains a target voltage, and
a current controller controlling a current of each said current control converter such that a charging/discharging current of each said current control converter attains a target current,
said target current of each said current converter is set based on said target voltage and a corrected corresponding input/output power command value, at a converter whose corresponding input/output power command value is corrected by said charging/discharging power control unit, and is set based on said target voltage and said corresponding input/output power command value by said first control device, at a converter whose corresponding input/output power command value is not corrected by said charging/discharging power control unit.

3. The electrical powered vehicle according to claim 1, wherein said charging/discharging power control unit calculates, when said sudden change is detected, a total of an input/output power of said rotating electric machine using a current rotational speed and correcting at least a portion of said plurality of input/output power command values such that the calculated total power is distributed among said plurality of power storage devices according to a ratio of a plurality of input/output power command values set by said first control device.

4. The electrical powered vehicle according to claim 3, wherein
said power command generation unit sets a charging/discharging power upper limit for each of said plurality of power storage devices based on a charging and discharging state thereof, and said charging/discharging power control unit corrects said plurality of input/output power command values, when said input/output power command value after correction exceeds said charging/discharging power upper limit for any of said plurality of power storage devices, such that a charging power or discharging power exceeding said charging/discharging power upper limit is distributed to a remaining power storage device not exceeding said charging/discharging power upper limit.

5. The electrical powered vehicle according to claim 3, wherein
said power command generation unit sets a charging/discharging power upper limit for each of said plurality of power storage devices based on a charging and discharging state thereof, and
said charging/discharging power control unit corrects said plurality of input/output power command values, for each of said plurality of power storage devices, when a corresponding input/output power command value after correction is greater than or equal to said charging/discharging power upper limit, such that a charging power or discharging power exceeding said charging/discharging power upper limit is distributed equally to each said power storage device.

6. The electrical powered vehicle according to claim 1, wherein said speed sudden-change detection unit detects a sudden change in said rotational speed when a change in rotational speed within a predetermined time detected by said speed detection unit exceeds a predetermined threshold value.

7. A control method for an electrical powered vehicle by a first control device and a second control device configured to allow transmission and reception with each other, said electrical powered vehicle including
a rotating electric machine configured to allow input and output of motive power with a drive shaft of said electrical powered vehicle,
a plurality of power storage devices provided in parallel, and
a power conversion device carrying out bidirectional power conversion between said rotating electric machine and said plurality of power storage devices,
said control method comprising the steps of:
detecting, by said second control device, a rotational speed of said rotating electric machine based on an output from a sensor provided at said rotating electric machine,
detecting, by said second control device, a sudden change in said rotational speed based on a detected result from said step of detecting a rotational speed,
generating, by said first control device, a plurality of input/output power command values of said plurality of power storage devices, respectively, according to an input/output power of said rotating electric machine based on said rotational speed detected at said step of detecting a rotational speed and a state of charge of each of said plurality of power storage devices, and
controlling, by said second control device, charging and discharging of said plurality of power storage devices through said power conversion device, according to said plurality of input/output power command values from said first control device set at said generating step, when said sudden change is not detected, and charging and discharging of said plurality of power storage devices through said power conversion device by correcting at least a portion of said plurality of input/output power command values from said first control device so as to reflect a change in said rotational speed, when said sudden change is detected.

8. The control method for an electrical powered vehicle according to claim 7, wherein said power conversion device includes a plurality of converters connected between a power line and respective said plurality of power storage devices, each converter configured to carry out bidirectional power conversion between a corresponding power storage device and said power line, and an inverter configured to carry out bidirectional power conversion between said power line and said rotating electric machine, said plurality of converters is classified into one voltage control converter, and a balance of at least one current control converter, said control method further comprising the step of controlling said voltage control converter such that a voltage of said power line attains a target voltage, and controlling a current of each said current control converter such that a charging/discharging current of each said current control converter attains a target current, said target current of each said current control converter is set based on said target voltage and a corrected corresponding input/output power command value, at a converter whose corresponding input/output power command value is corrected by said step of controlling charging and discharging, and is set based on said target voltage and said corresponding input/output power command value by said first control device, at a converter whose corresponding input/output power command value is not corrected by said step of controlling charging and discharging.

9. The control method for an electrical powered vehicle according to claim 7, wherein said step of controlling charging and discharging includes the step of calculating, when said sudden change is detected, a total of an input/output power of said rotating electric machine using a current rotational speed, and correcting at least a portion of said plurality of input/output power command values such that the calculated total power is distributed among said plurality of power storage devices according to a ratio of a plurality of input/output power command values set by said first control device.

10. The control method for an electrical powered vehicle according to claim 9, wherein said generating step sets a charging/discharging power upper limit for each of said plurality of power storage devices based on a charging and discharging state thereof, said step of controlling charging and discharging further includes the step of, when said input/output power command value after correction exceeds said charging/discharging power upper limit for any of said plurality of power storage devices, recorrecting said plurality of input/output power command values such that a charging power or discharging power exceeding said charging/discharging power upper limit is distributed to a remaining power storage device not exceeding said charging/discharging power upper limit.

11. The control method for an electrical powered vehicle according to claim 9, wherein said generating step sets a charging/discharging power upper limit for each of said plurality of power storage devices based on a charging and discharging state thereof, said step of controlling charging and discharging further includes the step of, when a corresponding input/output power command value after correction or after recorrection is greater than or equal to said charging/discharging power upper limit, further correcting said plurality of input/output power command values such that a charging power or discharging power exceeding said charging/discharging power upper limit is distributed equally to each said power storage device.

12. The control method for an electrical powered vehicle according to claim 7, wherein, in said step of detecting a sudden change, a sudden change in said rotational speed is detected when a change in said rotational speed within a predetermined time, detected at said step of detecting a rotational speed, exceeds a predetermined threshold value.

\* \* \* \* \*